(12) United States Patent
Polley et al.

(10) Patent No.: US 6,381,268 B2
(45) Date of Patent: Apr. 30, 2002

(54) METHODS AND DEVICE FOR ESTIMATING AND CORRECTING CLIPPING IN A DISCRETE MULTI-TONE COMMUNICATIONS SYSTEM

(75) Inventors: Michael Oliver Polley; Alan Gatherer, both of Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/729,008

(22) Filed: Dec. 4, 2000

Related U.S. Application Data

(62) Division of application No. 09/076,418, filed on May 12, 1998.

(51) Int. Cl.[7] .......................... H04B 1/38; H04M 11/10
(52) U.S. Cl. ...................................... 375/222; 379/92.3
(58) Field of Search ................................ 375/222, 346, 375/348, 219, 220; 379/92.3, 92.4; 370/210, 352, 389, 392

(56) References Cited

U.S. PATENT DOCUMENTS

| | | | | |
|---|---|---|---|---|
| 6,137,839 A | * | 10/2000 | Mannering et al. | 375/260 |
| 6,208,637 B1 | * | 3/2001 | Eames | 370/352 |
| 6,219,378 B1 | * | 4/2001 | Wu | 375/231 |
| 6,240,129 B1 | * | 5/2001 | Reusens et al. | 375/222 |

* cited by examiner

Primary Examiner—Chi Pham
Assistant Examiner—Khai Tran
(74) Attorney, Agent, or Firm—J. Dennis Moore; W. James Brady, III; Frederick J. Telecky, Jr.

(57) ABSTRACT

A method for obtaining a reliable estimate of the transmitter clipping error compliant with T1.413 ADSL standard is disclosed. An architecture is disclosed that uses the clipping error estimate at the receiver to reconstruct a frequency-domain compensation signal. The method for computing the compensation signal is disclosed along with an asymmetric digital subscriber line modem supporting T1.413 standard transmission/reception functions over a discrete multi-tone communications system capable of estimating clipping errors and computing clipping compensation signals.

6 Claims, 4 Drawing Sheets

FIG. 1

☆ = PROBABLE CLIPPING LOCATIONS IN TRANSMITTER

METHODS AND DEVICE FOR ESTIMATING AND CORRECTING CLIPPING IN A DISCRETE MULTI-TONE COMMUNICATIONS SYSTEM

This application is a divisional of prior application Ser. No. 09/076,418, filed May 12, 1998.

TECHNICAL FIELD

The invention relates generally to digital information transmission systems and specifically to techniques for controlling signal clipping over a discrete multi-tone channel such as an asymmetric digital subscriber line.

BACKGROUND OF THE INVENTION

The background is described in connection with an asymmetric digital subscriber line communications system, although the principles disclosed may be applied to other multi-tone or multi-carrier systems.

Digital Subscriber Line ("DSL") modems provide high-speed communication links over existing copper twisted-pair wiring connecting the telephone company central office to the residential customer. With one DSL modem in the CO and one in the home, a customer can connect to the backbone data network (e.g. the Internet) and achieve data throughput as high as 8 Mbits/second. Such a high data rate can facilitate new Internet applications, entertainment, education, etc.

Asymmetric Digital Subscriber Line ("ADSL") signaling was established as the ANSI T1.413 standard described in "T1.413-1995: Telecommunications—Asymmetric Digital Subscriber Line (ADSL) metallic interface", 1995, incorporated herein by reference. Discrete Multi-Tone ("DMT") modulation was chosen as the transmission method for ADSL. DMT is often called the line code and is a multi-carrier transmission method that partitions the available transmission bandwidth into many narrow bandwidth subchannels over which parallel data streams are transmitted. Because the different subchannels are affected differently by the transmission channel, the quality of the individual subchannels can be estimated and the data density of each subchannel can be adjusted to achieve maximum throughput.

Although the performance of a DMT system can be extraordinary, the complexity of the standard has precluded timely deployment of ADSL modems. As such, designs for simplifying modem implementation within the constraints of the ADSL standard are of significant merit.

ADSL modems apply a large amount of digital and analog signal processing to achieve data throughput that can be very near the theoretical channel capacity. Because of the Gaussian nature of DMT signals, it is necessary to support very high peak-to-average ratio ("PAR") values to prevent distortion and ensure high performance. However, to reduce modem complexity and cost, DMT modems are often designed to support lower PAR values. This savings in complexity often causes clipping of the DMT signal, which can reduce performance.

Clipping of the signal, or voltage waveform, occurs when large amplitude values are reduced to some maximum value that is less than the original value. This might occur when the signal contains amplitude values that exceed the maximum value supported by a transmitter circuit or algorithm, and hence are limited to the maximum allowed value.

In ADSL modems, some of the degradation caused by clipping is mitigated by forward error correction in the form of Reed-Solomon ("RS") coding, or RS coding combined with interleaving. RS coding combined with interleaving provides the greatest protection against clipping but requires a large amount of memory and causes a long delay and high latency that is unacceptable for certain applications. RS coding without interleaving removes latency problems but also provides less protection against clipping. It is desirable to altogether avoid implementation of RS decoding at the receiver for certain applications to reduce complexity and cost.

The ADSL standard allows the RS encoding to be turned off by setting the number of added parity bytes to zero. If another method of mitigating clipping effects is employed, the RS decoding operation can be eliminated without sacrificing performance. The elimination of the RS decoding operation allows implementation of the ADSL standard on a wider variety of general purpose programmable platforms.

Prior methods have been proposed for solving the DMT clipping problem. They typically involve application of complicated signal processing algorithms in the transmitter. In general, a DMT transmitter might offset the impairments generated in the Analog Front End ("AFE") by applying techniques to prevent clips in the AFE. However, most of these techniques require special coordination of actions by the receiver that does not fit within the confines of the ADSL standard.

As such, a technique is needed that fits within the ADSL standard and can be implemented at the receiver to allow performance gains with any ADSL standard modem.

SUMMARY OF THE INVENTION

The present invention comprises a method and device for dealing with clipping problems wherein the receiver compensates for standards compliant transmitted signals using a relatively low-complexity Analog Front End ("AFE").

According to one embodiment, a clipping estimation and correction method is disclosed that operates within the constraints of the T1.413 ADSL standard and eliminates the dependence on Reed-Solomon decoding and interleaving for adequate performance when the transmitter clips the transmitted signal. The method involves the steps of measuring the signal to noise ratio ("SNR") in all operating subchannels of the transmission channel; transmitting the SNR measurements for the operating subchannels to a transmitting device on the channel; communicating data over the operating subchannels using the SNR measurements to affect the throughput of data transmitted over the channel; exploiting the lowered throughput of the transmitted data to reliably compute an estimate of the clipping that occurred in the transmitter; applying the estimate of the clip to construct a compensation signal; and adding the compensation signal at the receiver to correct the clip that occurred at the transmitter.

The method can also include the steps of initializing the transmission subchannels by forcing fewer bits than they are capable of carrying and distinguishing DMT frames that have been clipped in the transmitter to make a threshold comparison that determines when a clip has occurred. If a clip has occurred, correction is applied. Otherwise, the received data needs no correction and is passed on to the user without modification.

Also disclosed is a method of compensating for clipping of signals transmitted over a digital subscriber line ("DSL") system wherein the signals are modulated using a multi-carrier transmission signaling technique over multiple subchannels of the DSL system and the signal to noise ratio ("SNR") of the subchannels vary from high to low. The method comprises the steps of transmitting a signal on the DSL system; analyzing the signal to determine if it has been clipped during transmission; and computing an error compensation signal for the signal if it is determined it has been clipped during transmission.

In another embodiment, a method of estimating the amplitude and location of a clip is disclosed. The method involves the steps of initializing the subchannels to create a compensation signal and adding the compensation signal in the receiver to enhance performance during decoding of the clipped frames.

The clipping estimation and correction methods of the present invention alleviate the need to compensate for transmitter clipping effects using forward error-correction coding. Thus, the methods of the present invention can be implemented on any modem platform, even one that does not support Reed-Solomon decoding.

According to another embodiment, a general purpose programmable modem that implements the T1.413 standard without Reed-Solomon decoding capabilities is disclosed. The modem supports T1.413 standard transmission/reception functions over a discrete multi-tone communications system and can be linked to an independent processing system such as a desktop or notebook computer. The modem comprises an interface having an analog side and a digital side with the analog side coupled to the communications system. The modem contains a signal processing device for transmitting and receiving signals to and from the communications system. The signal processing device has a system side and a user side with the system side coupled to the digital side of the interface. The interface is coupled to the user side of the signal processing device and forms a communications pathway between the independent processing system and the ADSL modem.

The modem incorporates the clipping error estimation and correction functions of the present invention. In particular, according to one embodiment, the ADSL modem contains stored program segments capable of causing the signal processing circuit to analyze original signals received from the communications system to determine if they have been clipped during transmission; compute error compensation signals for signals that are clipped during transmission; and add computed error compensation signal to the original signals received to obtain corrected analog signals.

BRIEF DESCRIPTION OF THE DRAWINGS

Other aspects of the invention including specific implementations are understood by reference to the following detailed description taken in conjunction with the appended drawings in which.

References in the figures correspond to like numerals in the detailed description unless otherwise indicated.

DETAILED DESCRIPTION OF THE PREFERRED EMBODIMENTS

Figure 1:
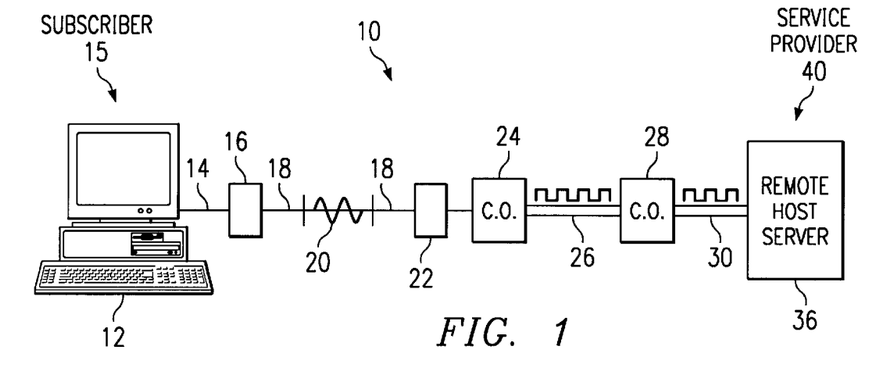
FIG. 1 is a diagram illustrating a communications system wherein the invention can be practiced.

FIG. 1 illustrates an example communications system 10 in which the invention can be practiced according to one embodiment. The communications system 10 includes a service provider 40 that is accessible by one or more subscribers 15. Generally, the subscriber 15 has the transmission/reception and data processing equipment enabling access to the service provider 40.

As shown, a first processing system 12 is operably coupled to a first modem 16 via interface 14. The interface 14 provides a communications pathway for unmodulated data transfers between the first modem 16 and the first processing system 12. Alternatively, the first modem 16 could be internally fixed inside the first processing system 12 and coupled through a standard interface of the first processing system 12. Exemplary interface standards employed between the modem 16 and the first processing system 12 include EISA, PCMCIA, RS-232 and other industry accepted interface protocols.

In operation the first processing system 12 communicates digitally with the first modem 16. Data from the first processing system 12 is transferred through the interface 14 and maintained in a buffering mechanism such as an internal memory space (ROM or RAM) or other similar configuration inside the first modem 16. In many applications, a universal asynchronous receiver transmitter ("UART") or other similar device is used to handle data flow between the first processing system 12 and the modem 16.

The first processing system 12 can be a desktop or notebook computer, workstation or other similar computing device. The first modem 16 includes a signal processing device for converting digital data from the processing system 12 to an equivalent modulated analog waveform. The modem also includes an interface such as an analog front end ("AFE") which couples the analog signals carrying the data to the communications link 18 to the central office 24.

Typically, the transmit and receive functions of the modem 16 are operated by the processing system 12. A digital-to-analog/analog-to-digital conversion circuit or other similar signal processing device can be used to transmit and receive analog signals via the communications link 18. The communications link 18 can be analog twisted pair ("ATP") wiring or other medium of the type often used in public switched telephone networks ("PSTN").

The digital data from the processing system 12 is converted to analog equivalent signals which are transmitted on the ATP wiring 18 using known modulation methods. Examples of such modulation methods include Quadrature Amplitude Modulation ("QAM"), Trellis Code Encoding ("TCE") and Frequency Shift Keying ("FSK") among others. Likewise, the service provider 40 receives the signals from the far end central office 28 the digital backbone connection 30. The data is passed to the second processing system 36 at the service provider location 40. The processing system 36 is employed by the service provider 40 to gain access to the central office 28 and to format, receive and transmit data to other entities such as subscriber 15.

Both processing systems 12 and 36 contain the necessary processing and storage capabilities and run suitable application programs for such functions.

As described herein, the invention has particular application in a DMT-compliant signaling system with a pair of ADSL modems communicating over a network 50. In one embodiment, an ADSL modem on the CPE unit 18 side communicates with another ADSL modem 22 maintained by the central office 24. With such a configuration, multiple transmission channels can be maintained: a high speed downstream channel, a medium speed duplex channel, and a Plain Old Telephone Service ("POTS") channel. The POTS channel can be split off from the ADSL modem by filters, thus guaranteeing uninterrupted POTS, even if ADSL fails. The high speed channel ranges from 1.5 to 6.1 Mbps, while duplex rates range from 16 to 640 kbps. Each channel can be submultiplexed to form multiple lower rate channels. Still other data rates may be employed as may be standardized in the industry.

Downstream data rates depend on a number of factors, including the length of the copper line, its wire gauge, presence of bridged taps, and cross-coupled interference. Line attenuation increases with line length and frequency, and decreases as wire diameter increases.

Preferably, the communications system 10 supports both downstream and upstream communications. Typically, when a subscriber 15 wishes to place a call, the modems 16 and 22 send probing tones via the analog line 18. The central office 24 comprises the call switching and routing equipment necessary to complete a path between the subscriber 15 and the service provider 40.

The functionality of the subscriber 15 and the service provider 40 can be implemented using known methods and devices. For example, the signaling protocols used by the various devices on the system 10 may include those supported by the International Standard Organization ("ISO"), the International Telegraph and Telephone Consultative Committee ("CCITT") and the Electronics Industries Association ("EIA") among other standards bodies.

Once a call is established, data from the first processing system 12 is passed to the first modem 16, modified appropriately with signal processing techniques to prepare the data for robust transmission, and converted using a digital to analog convertor or other similar conversion device. Next the modem 16 transmits the converted digital stream using a modulated analog signal carrier 20 over analog twisted pair 18 to the central office 24. At the central office, another DSL modem 22 decodes the data and ports it to the digital backbone network 26. The digital backbone network 26 connects the central offices 24 and 28. The central office 28 receives the digital data from the backbone 26 and port it on the digital link 30 the service provider's processing platform 36.

As shown, the near end central office 24 communicates with the far end central office 28 via the digital backbone network 26 which is often a high speed digital link providing a high data rate. The analog signals 18 are received by the second modem 22 and demodulated to obtain the original data sequence generated by the first processing system 12. The second modem 22 passes the digital bit stream sequence to the digital backbone network 26 and on the far end central office 28. Thus, processing systems 12 and 36 communicate with each other through communications facilities comprised of communications mediums 16, 18, 22, 24, 26, 28, 30 and 32. The service provider 40 can be an Internet service provider or dedicated data service provider of the type available in industry. The modems 16 and 22 comprise the data communication equipment ("DCE") responsible for providing the required translation and interface between the digital and analog signals carried on the system 10.

Preferably, the modems 16 and 22 are designed to transmit and receive analog signals tuned to one or more analog carrier frequencies. The data from the processing systems 12 is superimposed upon one or more carrier frequencies and transmitted on the system 10. The data signals is often referred to as the base band signal. The carrier signal 18 is changed back to the digital signal at the receiving modem 22 through the process of demodulation. In essence the modems 16 and 22 provide the transmit and receive functions for the binary bits of digital data generated by the processing system 12 at the subscriber location 15.

Figure 2:
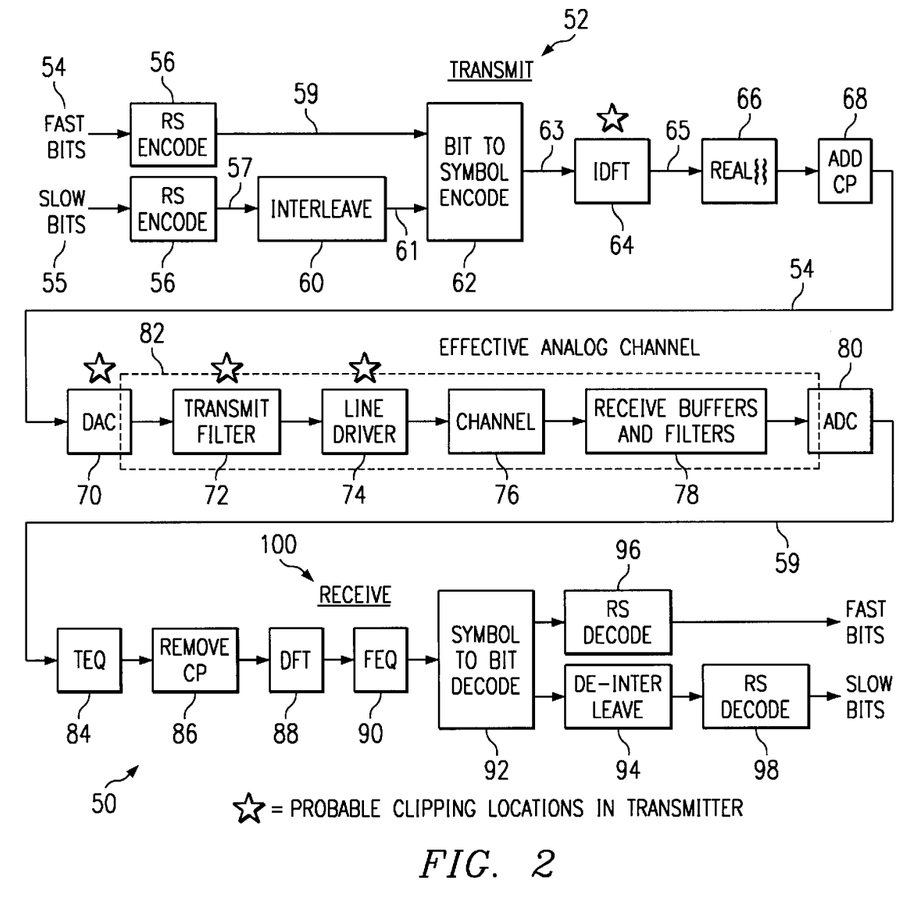
FIG. 2 shows the functions required for transmission of data from one ADSL modem to another.

FIG. 2 is a process flow diagram 50 illustrating the functions required for transmission of data from one Discrete Multi-Tone ("DMT") modem to another. Preferably, the functions are implemented on a pair of T1.413 compliant Asymmetric Digital Subscriber Loop ("ADSL") modems. Typically, each modem implements both transmit 52 and receive 100 functions. Thus, the methods of the present invention can be implemented on any modem platform, even one that does not support Reed-Solomon decoding.

For example, according to another embodiment, a general purpose programmable modem that implements the T1.413 standard is disclosed. The modem supports T1.413 standard transmission/reception functions over a discrete multi-tone communications system and can be linked to an independent processing system 12 such as a desktop or notebook computer. Preferably, the modem comprises an interface having an analog side and a digital side with the analog side coupled to the communications system 10. A signal processing device for transmitting and receiving signals to and from the communications system 10 where the signal processing device is coupled to the digital side of the interface. The user interface formings a communications pathway between the independent processing system 12 and the ADSL modem.

The modem incorporates the clipping error estimation and correction functions of the present invention. In particular, according to one embodiment, the ADSL modem contains stored program segments capable of causing the signal processing circuit to analyze original signals received from the communications system to determine if they have been clipped during transmission and compute error compensation signals for signals that are clipped during transmission. The modem can then add the computed error compensation signal to the original signals received to obtain corrected analog signals.

With reference to FIG. 2, the transmit path 54 shown is in one direction although an actual bi-directional ADSL communications link between modems extends in both directions . Reed-Solomon ("RS") forward error-correction encoding 56 can be applied to both fast bits 54 and slow bits 55 in the transmitter. Preferably, the RS-encoded slow bits 57 are interleaved 60 to provide extra resistance to clipping and channel error. Thus, performance is improved at the expense of additional encoding delay.

Next, the RS-encoded fast bits 59 are combined with the RS-encoded and interleaved slow bits 61 in a frame of bits that is converted into a frame of two-dimensional transmission symbols 62. Preferably, the transmission signals represent information in a form that is conducive to robust transmission over an ADSL communications link. Next, the Inverse Discrete Fourier Transform ("IDFT") 64 is applied to the frame of transmission symbols 63 after appropriate conjugate mirroring of the frame according to the T1.413 standard.

The conjugate symmetry enforced on the IDFT input 63 causes the output 65 to be completely real. As shown, the REAL{ } operator 66 indicates that the imaginary component of the IDFT output 65 is not used. Next a cyclic prefix is created from the last samples of the frame of real data and concatenated 68 to the beginning of the frame. Thus, the resulting frame of data is passed through a Digital-to-Analog Converter ("DAC") 70 and a transmit filter 72 that provides the low-pass and high-pass filtering functions. The filtering functions are required to ensure the transmitted signal does not exceed the T1.413 power spectral density mass.

A line driver circuit 74 can be used to provide the current and/or voltage gain required to place the filtered signal onto the twisted pair telephone line with an ADSL format with the appropriate power level. After transmission through the channel 76, the signal passes through receive buffers and filters 78 and into the Analog-to-Digital Converter ("ADC") 80. The effective analog channel 82 seen by the transmission system is formed by the analog portion of the DAC 70, the transmit filters 72, the line driver 74, the actual DSL channel 76, the receive buffers and filters 78, and the analog portion of the ADC 80.

In one embodiment, a Time-domain Equalizer ("TEQ") is applied 84 to the signal to shorten the time-domain impulse response of the entire analog channel. The combined analog channel 82 and TEQ 84 form an effective "shortened" channel whose impulse response has energy concentrated in a small number of samples. Preferably, significant energy is concentrated in the same number of samples as are present in the cyclic prefix 68.

A frame of data is formed and the cyclic prefix is removed 86. The Discrete Fourier Transform ("DFT") 88 can then be applied to the signal. As shown the transformed signal is processed with a Frequency-domain Equalization ("FEQ") function 90 which compensates for channel distortion. Next, the frame of FEQ output symbols is decoded into bits 92. The slow bits are passed through a de-interleaver 94 which spreads out transmission errors over many frames. Both fast and slow bits are passed through RS decoders 96, 98 to correct transmission errors and/or errors caused by clipping in the transmitter.

FIG. 2 shows the possible locations where clipping can occur in the transmitter (indicated by the "* "). The location * at which a clip occurs typically depends on the design of the transmitter. Preferably, the method of estimating the clipping distortion and applying clipping compensation of the present invention works within the constraints of the T1.413 standard thus guaranteeing compatibility between a low-complexity modem implemented without RS decoding capabilities and the large possible range of T1.413 compliant modems that may be employed.

In operation, during initialization and training, the Signal-to-Noise ("SNR") is measured in all the operating subchannels of the receiver. The SNR values are then communicated back to the transmitter so that the transmitter can properly allocate bits to each subchannel to maximize the transmission throughput.

In one embodiment, a small subset of the operating subchannels are forced to carry fewer bits than they are capable of supporting. This provides the receiver with the ability to estimate the position and amplitude of clipping errors. For example, during initialization the receiver can inform the transmitter that subchannels 33, 34, 35, and 36 have a low SNR and should only carry two bits each. This results in a symbol constellation composed of four points ("4-QAM") being used for subchannels 33, 34, 35 and 36. The 4-QAM result applies to the case of T1.413 transmission where the Trellis encoding is not employed. Similar constraints hold true when Trellis encoding is applied, i.e. two bits per subchannel will still result in a low-density constellation.

In addition, due to low data density, it is highly likely that the received symbol will be nearest in Euclidean distance to the transmitted symbol at the receiver. Preferably, the receiver can reliably estimate that the transmitted symbol was the constellation point nearest the received symbol. A reliable estimate of the transmission error can then be computed as the difference between the received signal and the closest constellation point.

The use of a reliable estimate of the transmission error in a given frame is provided within the T1.413 standard. The reliable estimate facilitates the methods for computing a clipping compensation signal at the receiver as described herein.

Figure 3:
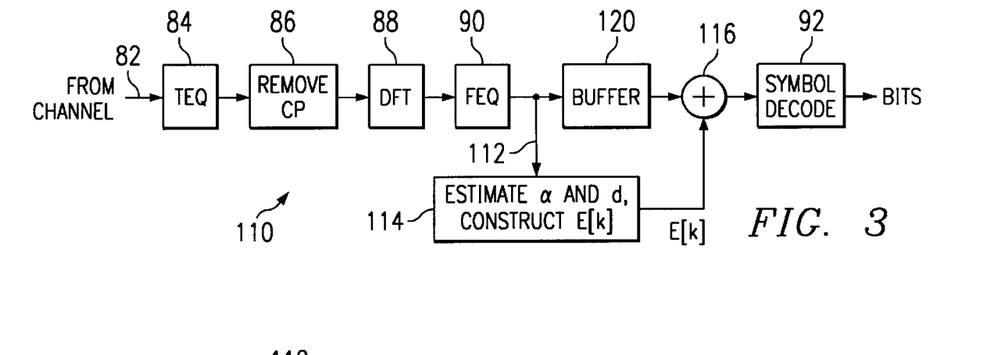
FIG. 3 is a block diagram for a receiver architecture that implements the clipping estimation and correction methods according to one embodiment.

Turning to FIG. 3, a block diagram of a receiver according to one embodiment is shown and denoted generally as 110. In general, the receiver is configured to perform the clipping estimation and correction functions.

The received signal 82 from the channel is passed through the TEQ 84. Next, the cyclic prefix is removed 86 prior to the DFT function 88 being applied. The FEQ 90 corrects channel distortion as in a normal DMT receiver with a portion of the frame output from the FEQ being analyzed. The tones which were made to carry fewer bits are made available to the receiver for computing an error correction signal E[k]. If analysis of the incoming signal 82 indicates a need for clipping correction, then the correction signal (E[k]) is computed 114 and added 116 to the FEQ output 112.

The analysis of the incoming signal 112 can be accomplished in a variety of ways. For example, in one embodiment a buffer 120 is used to indicate that the correction signal E[k] is added 116 back to the frame from which the clipping parameters were estimated. The clipping-corrected frame of symbols are then passed through the symbol decoder 92 to produce the transmitted bits.

Figure 4:
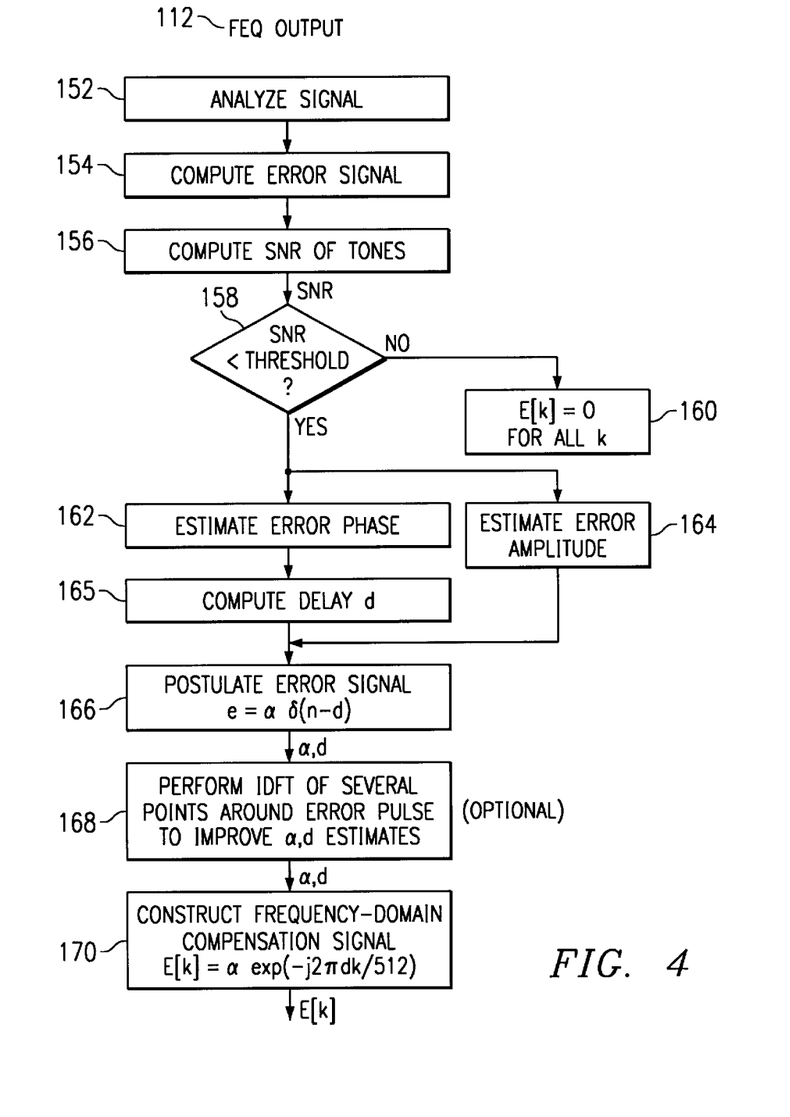
FIG. 4 is a process flow diagram illustrating a method for detecting the need for fixing a clip and estimating the clipping signal according to one embodiment.

FIG. 4 shows a preferred embodiment of the method 150 used for detecting the need for fixing a clip and then estimating the clipping signal. The clipping signal allows the receiver to construct a correction signal E[k] if needed. First, the FEQ output 112 is analyzed, and the SNR is computed at step 156 for the tones which were forced to carry less bits than they are capable of carrying. At this point, the SNR is compared to a stored threshold, step 158. If the SNR is above the threshold, then no significant clipping occurred. Also, no clipping compensation should be applied and process flow is directed to step 160. In one embodiment, the compensation signal (E[k]) is set to zero for all values (k) as shown in step 160. This results in no clipping compensation being applied. Alternatively, the step of adding the compensation signal can be avoided and there is no need to add zeros.

If the SNR is below the threshold, then a significant clip has occurred and process flow is directed to either step 162 or step 164. The clipping error e[n] can be defined as the difference between the unclipped signal and the clipped signal in the transmitter. As such, the frequency-domain error signal at the receiver can be used to compute the amplitude, step 164, and phase, step 162, of the time-domain clipping error. In one embodiment, an estimate is made based on the premise that at least one clip occurred in the transmitter. Thus, a model for the clipping error e[n] can be devised as an impulse of amplitude ($\alpha$) and delay (d) as shown below in Equation 1:

$$e[n]=\alpha\delta(n-d) \qquad \text{Equation 1}$$

The DFT of the clipping error is therefore computed as shown below in Equation 2:

$$E[k]=\alpha \exp(-j2\Pi kd)/N \qquad \text{Equation 2}$$

In equation 2, k is the sample index of the time-domain DMT signal and N is the number of DFT points. According to one embodiment of the ADSL standard, N=512, k ranges from 0 to 255, and d can assume any value from 0 to 511.

The absolute value of the frequency-domain error signal is equal to the amplitude of the clipping error alpha ($\alpha$). The phase of the frequency-domain error signal can be used to compute the delay (d) as shown in step 164. The estimated values of the delay (d) and alpha ($\alpha$) specify the location and value of the time-domain clipping error [n]. As shown in step 166, to enhance the quality of the clipping compensation signal, additional operations can be applied to verify and possibly correct the position estimated delay (d).

Figure 5:
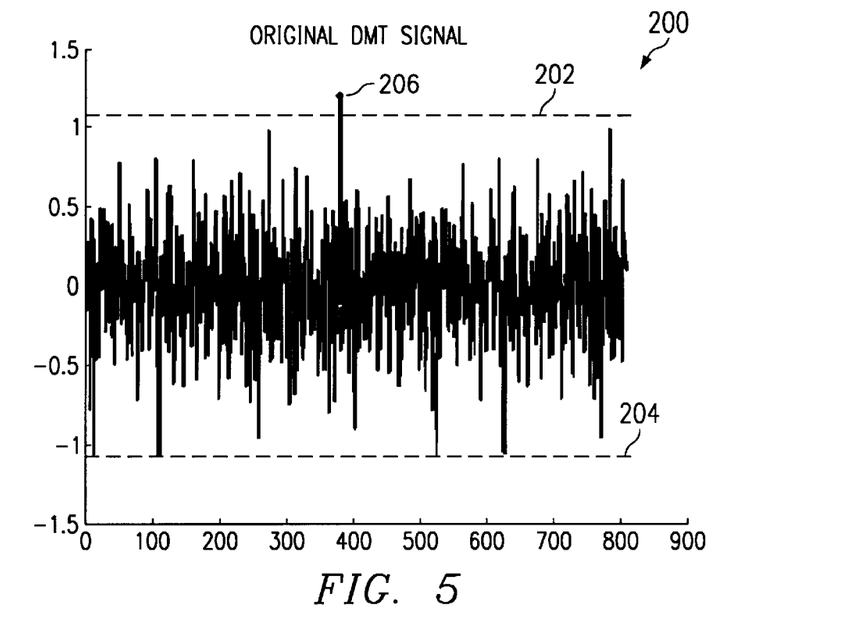
FIG. 5 shows a frame of data generated by an ADSL DMT transmitter.
Figure 6:
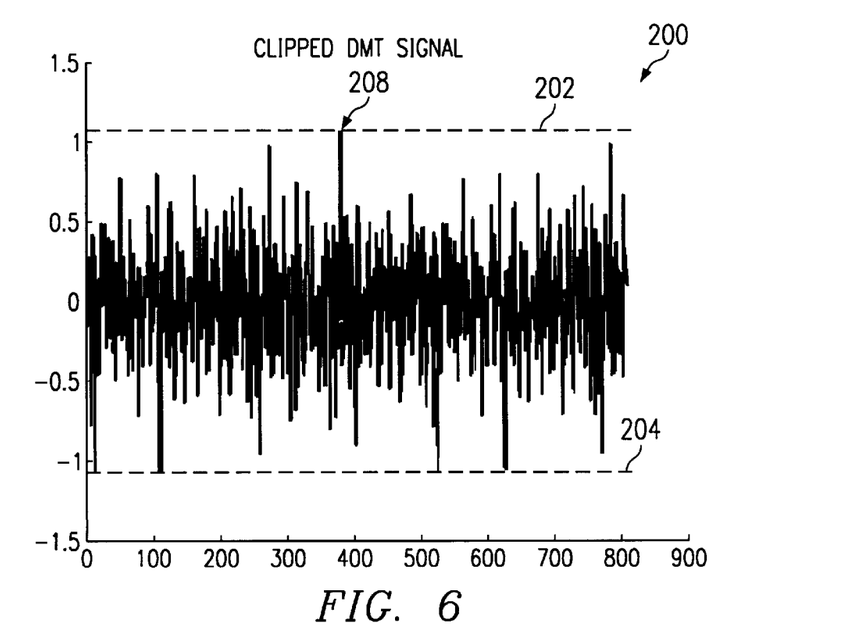
FIG. 6 shows the frame of data of FIG. 4 after clipping.

If channel distortion has been properly compensated by the receiver, then an estimate of the clipped DMT signal at the transmitter can be reconstructed by applying an IDFT operation, step 168, to the FEQ output 112. At this point, the most probable position of the clipping error can be analyzed to see if the time-domain sample is near the amplitude rails. The amplitude rails comprise the positive and negative signal limits of the system 10 as shown in FIGS. 5 and 6.

If the time-domain sample is near the amplitude rail of the system, then the current position estimate is probably correct. If not, then it is highly likely that one of the surrounding samples is near the amplitude rails and therefore the most likely position of the clipping error is at one of the surrounding samples. An ad-hoc technique may be applied to improve performance of the location estimation function as is known by those of ordinary skill.

In one embodiment, step 168 involves a small search of the samples on either side of the most probable clip location. If the sample values are found in the search that are closer to the rail value than the sample at the estimated clipping location, the estimate of the clipping location is changed to the location of the point nearest the rails.

Preferably, only a few points on either side of the estimated clipping location in the search are considered. This limits the need for computing a full IDFT at step 168. A few points of the IDFT can be computed to obtain the required information, e.g. the IDFT at the estimated clipping location and two points on either side of that can be computed for a total of five IDFT points.

Based on the best estimate of alpha ($\alpha$) and (d), the clipping compensation signal E[k] can be computed at step 170. While E[k] can be generated as a time-domain signal, some advantages are provided by directly computing the frequency-domain compensation signal. Thus, the compensation signal E[k] can be directly added to the FEQ output 112 and further decoding operations can then be applied. This approach is preferred in some applications since it results in low complexity of the receiver.

In other embodiments, it could prove advantageous to generate the compensation signal E[k] in the time domain and add it to the time domain signal before performing another DFT operation.

The clipping estimation and correction method 150 can be verified in the context of an ADSL transmission system operating over a standard 24 AWG twisted pair to verify operation and performance. FIG. 5 shows a frame of data 200 generated by an ADSL DMT transmitter. The dashed lines 202, 204 represent the maximum amplitude levels supported in the transmitter. Also shown is a sample point 206 that exceeds the maximum allowable signal level levels for the system 10.

FIG. 6 shows the same frame of data 200 after clipping wherein the new largest value 208 fits within the rails. The signal 200 has been clipped 208 to an amplitude value that is contained within the limited values supported by the ADSL modem. As explained above, the most probable location where the signal was clipped are in the IDFT operation 64, the DAC 70, the transmit filter 72 and the line driver 74.

Figure 7:
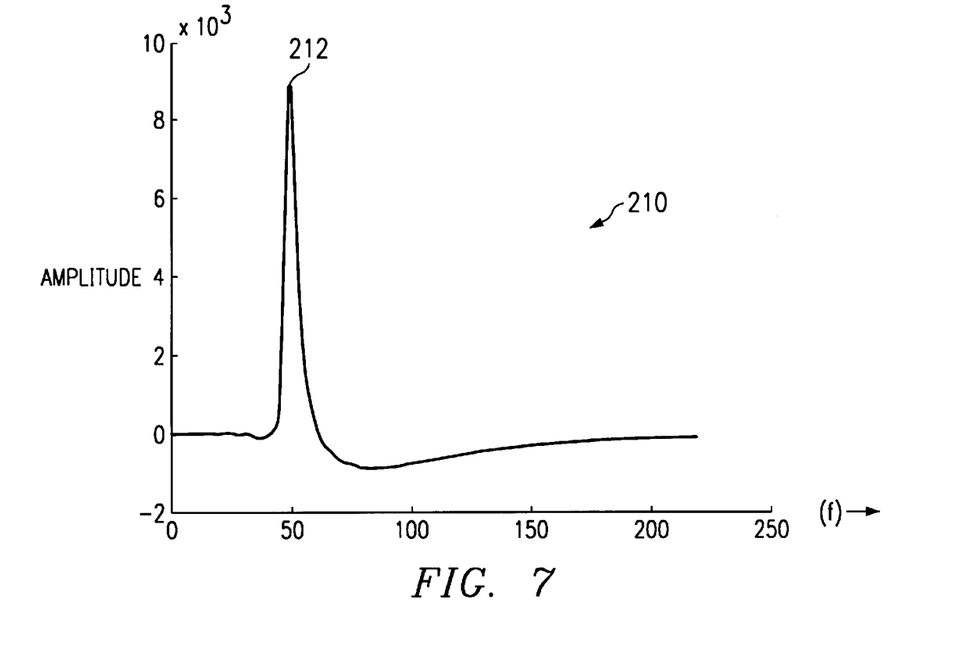
FIG. 7 shows the impulse response of the DSL channel used in an ADSL simulation.

FIG. 7 shows the response curve 210 of the DSL channel used in the simulation. Note that the impulse response 212 of the ADSL channel overlaps with the voice band which extends from 20 Hz to 3.4 KHz.

Figure 8:
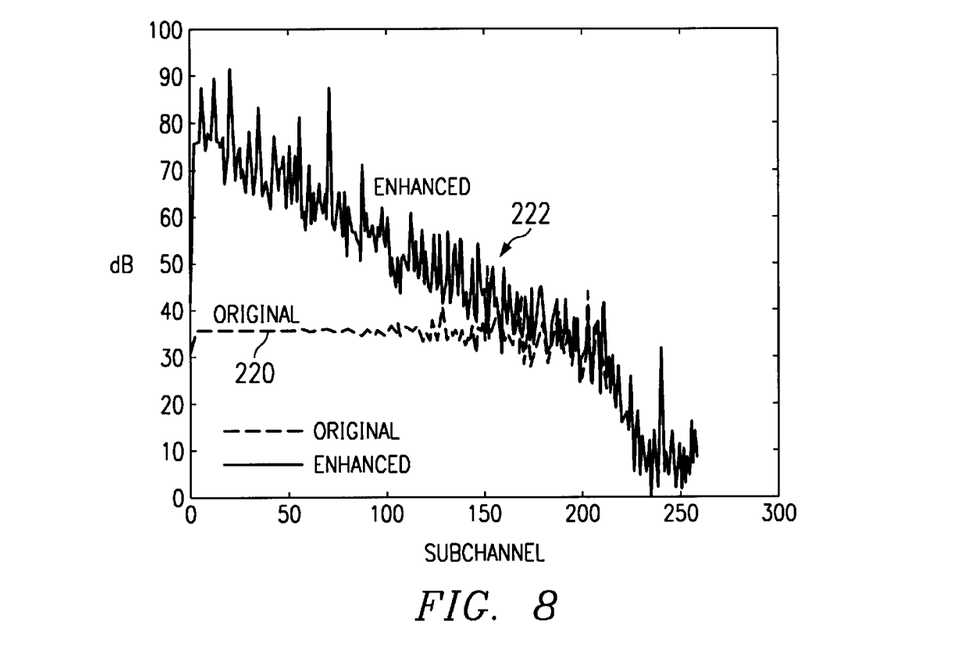
FIG. 8 shows the subchannel SNR of a single received data frame for each of the 255 subchannels.

FIG. 8 shows the subchannel SNR of a single received data frame for each of the 255 subchannels. The original SNR 220 is shown by the dashed line. The enhanced signal 222 is shown by the solid line. Because of the significant clip at the transmitter, the subchannel SNR is limited to about 36 dB. The SNR after enhancement of signal 222 results from application of the clipping estimation and correction method 150 according to the present invention. As before, overlap of the response signal from the ADSL channel is shown overlapping the voice band.

As shown, the SNR at the receiver after enhancement with the clipping estimation and correction method 222 has been increased dramatically. In the high-frequency regions where the channel noise is greater than the clipping noise, the original and enhanced SNR are roughly equivalent. In general, when large clips occur at the transmitter, a more dramatic improvement is observed because the original system SNR is very low.

Preferably, the optimal threshold to use in the algorithm is determined by the quality of the transmission channel which, in turn, is determined by line length and interference characteristics. Typically, the error signal can be estimated more accurately when the tones are analyzed to estimate the clip parameters having high SNR. In one embodiment, the optimal threshold can be computed based on performance parameters required for a specific application and a particular modem.

In general, a heuristic approach for selecting the delay (d) and alpha ($\alpha$) based on observations of the transmission channel are highly effective for determining a near-optimal threshold setting. When the error magnitude computed at the receiver is small, the phase computation is difficult and the position estimate of the clip will be inaccurate. However, if the error magnitude is large, accurate phase computation is reliable, and hence clip position estimation is reliable. Thus, large clips which would cause the most harm are easiest to correct, while small clips that would do the least damage are more difficult to correct.

According to one embodiment, a correction method is used wherein a threshold is set so that the algorithm is not applied if the clip is judged to be small enough that the algorithm would not perform well.

The probability of having two or more independent clips in a transmitted frame is extremely small. However, the probability is non-zero and hence should be given some consideration. According to one embodiment, the clipping estimation and correction method 150 is applied to correct multiple clips with a slight modification. For example, to correct two clips, the model of the clip at the transmitter is changed to:

$$e[n]=\alpha\delta[n-d_1]+\beta\delta[n-d_2] \qquad \text{Equation 3}$$

Equation 3 allows a correction signal to be computed for two clips of different amplitudes and delays. The analysis of clipping error may be performed more carefully to properly estimate the parameters of the equation. Typically, more tones are required for adequate estimation of the parameters. At the minimum, two tones are used in the estimation procedure to determine the four parameters.

Preferably, the transmitter clipping occurs at the IDFT operation 64, the DAC 70, or the early stages of the transmit filter 72 since a clip that occurs at the line driver 74 is more difficult to correct since it is a nonlinear response that occurs between components of the overall analog channel 82. A modem can be designed accordingly to guarantee the location of the clipping using known designs.

In one embodiment, the clip signal is modified to represent the analog channel with two components. The first component is the, part of the channel before the clip. The second component is the part of the channel after the clip. Using the modified clip signal, a clip that occurs at the line driver 74 can be represented as a delayed and shifted impulse subtracted from the signal after the first portion of the channel.

According to one embodiment, the first portion of the analog channel 82 is constructed at the receiver. Next, the FEQ 90 reverses the effect of which includes the first portion. Here, the FEQ 90 output frame is multiplied by the frequency response of the first portion of the analog channel. At this point, the analysis and clipping compensation signal is computed as before.

It is noted that the resulting compensation signal E[k] can be multiplied by the inverse of the frequency response of the first portion of the analog channel 82 before being added to the FEQ output 112. Essentially, this estimates the delayed and scaled impulse that occurs in the line driver 74 and computes a compensation signal E[k] that appears as though the clip has traveled through only the second half of the transmission channel 82 as opposed to the entire transmission channel 82.

While the invention has been described in conjunction with preferred embodiments, it should be understood that modifications will become apparent to those of ordinary skill in the art and that such modifications are intended to be included within the scope of the invention and the following claims.

What is claimed is:

1. A device for communicating information over a discrete multi-tone communications system comprising:
    an analog front end coupling said device to said communications system;
    a signal processing circuit driving said analog front end;
    an interface capable of transmitting digital data from an independent processing system to the signal processing circuit, the signal processing circuit configured to convert the digital data to analog signal waveforms and transmit the waveforms over the communications system via the analog front end; and
    a storage device containing a plurality of program instructions that control the functionality of said signal processing circuit, said storage device operably linked to said independent processing system, wherein said program instructions form routines that cause the signal processing circuit to perform the following functions:
    transmit signals over the communications system;
    receive signals transmitted over the communications system;
    analyze received signals to measure the signal to noise ratio of the received signals; and
    based on the measured signal to noise ratio, compute error compensation signals for signals that are clipped during transmission.

2. The device according to claim 1 further including a microprocessor coupled to said signal processing circuit, the microprocessor configured to read said program instructions and cause said signal processing device to perform said functions.

3. The device according to claim 1 wherein said signal processing circuit contains a digital-to-analog conversion circuit for converting digital signals to modulated analog equivalents suitable for transmission on said communications system.

4. The device according to claim 3 wherein said modulated analog equivalent are T1.413 complaint signals.

5. A digital subscriber line ("DSL") modem supporting standard transmission/reception over a discrete multi-tone communications system, the DSL modem communicable linked to an independent processing system and comprising:
    an interface having an analog side and a digital side, the analog side coupled to the communications system;
    a signal processing device for transmitting and receiving signals to and from the communications system, the signal processing device having a system side and a user side, the system side coupled to the digital side of the interface;
    a user interface coupled to the user side of the signal processing device and forming a communications pathway between the independent processing system and the DSL modem; and
    a plurality of stored program segments operably coupled to said signal processing circuit for controlling the functions thereof, wherein said stored program segments are capable of causing said signal processing circuit to perform the following functions:
    measure the signal to noise ratio of transmitted signals over said communications system;
    compute error compensation signals, based on the measured signal to noise ratio, for original signals that are clipped during transmission; and
    add computed error compensation signals to the original signals received to obtain corrected analog signals.

6. The ADSL modem according to claim 5 wherein said stored program segments are further capable of causing said signal processing circuit to convert analog signals to their digital data equivalent, said analog signal comprising both original analog signals and corrected analog signals.

* * * * *